United States Patent [19]

Marshall

[11] 3,948,306
[45] Apr. 6, 1976

[54] TIRE REMOVING TOOL

[76] Inventor: Don J. Marshall, Box 410, Rte. 6, Edgewater, Md. 21037

[22] Filed: Nov. 14, 1974

[21] Appl. No.: 523,581

[52] U.S. Cl. .............................................. 157/1.26
[51] Int. Cl.² ......................................... B60C 25/06
[58] Field of Search.................. 157/1.17, 1.26, 1.28

[56] References Cited
UNITED STATES PATENTS

| | | | |
|---|---|---|---|
| 2,535,562 | 12/1950 | Boger et al. ....................... | 157/1.26 |
| 2,684,710 | 7/1954 | Calvin................................. | 157/1.17 |
| 3,006,404 | 10/1961 | Marshall............................ | 157/1.26 |
| 3,841,380 | 10/1974 | Marshall............................ | 157/1.26 |

Primary Examiner—Al Lawrence Smith
Assistant Examiner—James G. Smith
Attorney, Agent, or Firm—William J. Dick

[57] ABSTRACT

A tool for removing a tire from an annular rim, the rim having an upstanding circumferentially extending flange and having a substantially closed web with a central aperture therein, the tool comprising a barrel having a radially extending bracket thereon. A rod having a first portion which extends through the barrel is adjustable axially of the barrel, the rod including a second portion which extends substantially perpendicular to the first portion. The second portion of the rod has a length sufficient to overlie the central aperture of the web of the rim. A shoe member is slidably disposed on the second portion of the rod and adapted to embrace the web of the rim on one side thereof with the second portion of the rod on the opposite side thereof adjacent the periphery of the aperture. Locking means are disposed for clamping the first portion of the rod in a predetermined axial position in the barrel. Means are provided on the bracket for receiving a power unit to operate in conjunction with the tool for removing a tire from the rim.

11 Claims, 7 Drawing Figures

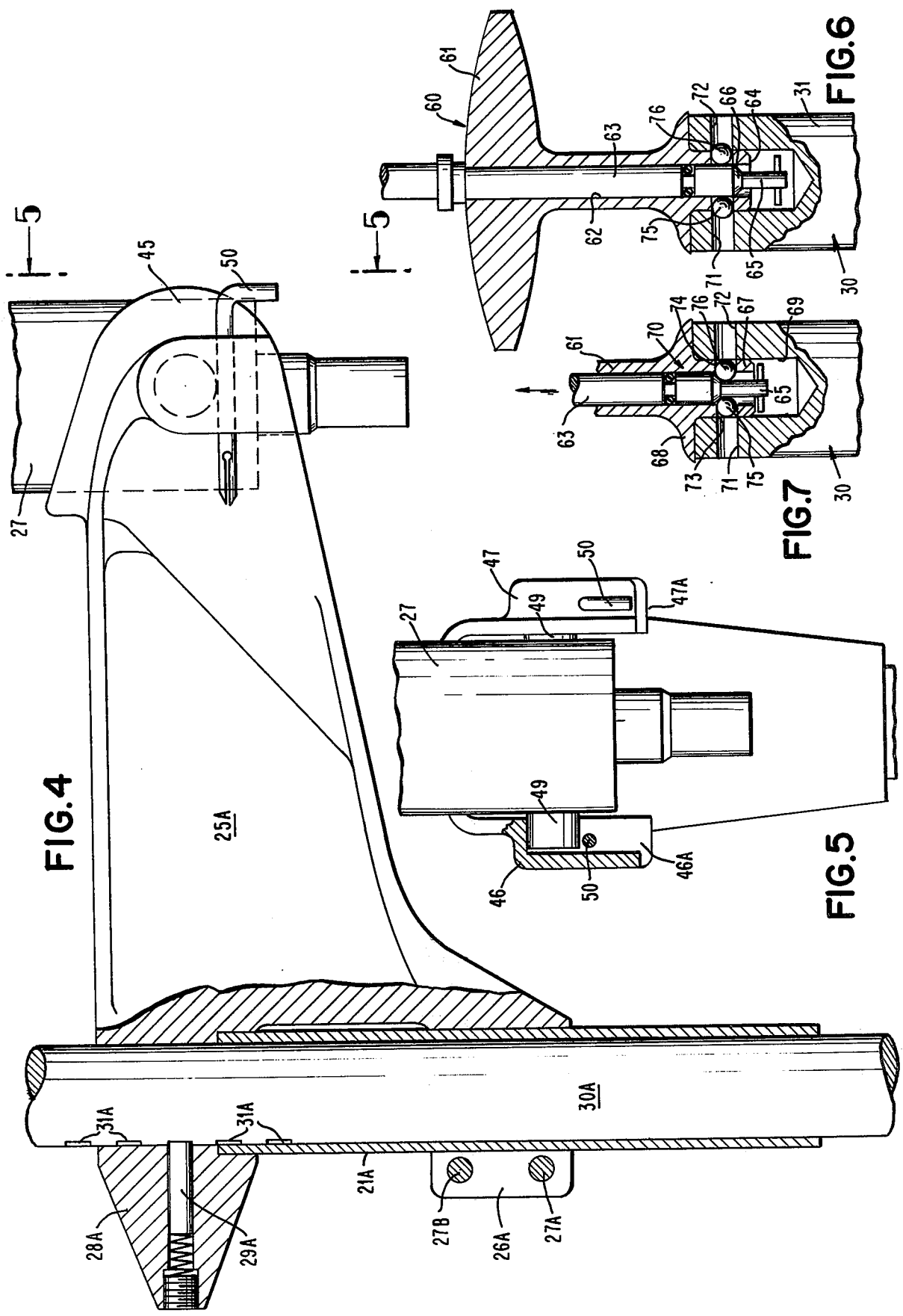

TIRE REMOVING TOOL

The purpose of this abstract is to enable the Public and the Patent Office to determine rapidly the subject matter of the technical disclosure of the application. This abstract is neither intended to define the invention of the application nor is it intended to be limiting as to the scope thereof.

SUMMARY OF THE INVENTION AND STATEMENT OF THE PRIOR ART

The present invention relates to a tire removing tool, and more specifically relates to a portable power operated tool for removing a tire from the rim of a wheel wherein the rim has a substantially closed web with a central aperature therein.

In recent years numerous innovations have occurred for the mounting of truck tires and the like on rims. Moreover, changes in the basic rim structure, while supposedly affording a greater margin of safety, have created problems in changing the tire or removing it from the rim structure. In prior art power operated tire removing tools, such as illustrated in U.S. Pat. No. 2,844,194, issued on July 22, 1958 to the present inventor and in U.S. Pat. No. 3,002,548 issued on Oct. 3, 1961 to the present inventor, a portable power operated tire removing tool is illustrated in which the tire bead is removed from the flange of the tire rim by a wedge-shaped power actuated tool, the tool being also clamped through the rim adjacent the opposite flanges of the rim thereby providing a pinching action when the tool is energized. With more recently designed rims, while the tools above decribed are still practical where the rim includes a disk or web with apertures or holes in the wheel rim, only those rims with large enough holes adjacent the peripherally extending flange of the rim (to form what are essentially spokes in the wheel) allow the hook to pass through. In recent years the apertures or holes in the web have been made smaller and in some instances have been eliminated entirely except for the single central aperture where the axle end passes through.

In Applicant's application Ser. No. 293,313 filed on Sept. 29, 1972 and now U.S. Pat. No. 3,841,380 issued on Oct. 15, 1974 is described an adapter for a portable power-operated removing tool which adapter is usable for breaking the bead on heavy tires to separate the tires from the rim. Although the adapter may be used in some instances to remove the tire, its principal use and purpose is to separate the bead of the tire from the annular rim. The adapter described in the above identified patent is specifically useful for rims having a substantially closed web with, for example, a single central aperture.

In view of the above it is a principal object of the present invention to provide a novel tool for removing a tire from an annular rim of a wheel in which the rim has a substantially closed web with a central aperture therein.

Another object of the present invention is to provide a portable tire removing tool which is simple in operation and which may be effectively used to separate and remove the tire completely from the rim of a wheel.

Still another object of the present invention is to provide a novel tool which quickly and easily may lock to the substantially closed web of a rim and which may be utilized in conjunction with a power unit to drive a tire from the rim.

Aother object of the present invention is to provide a novel tool for removing a tire from an annular rim, which tool may be quickly and easily positioned, without removal, in a plurality of positions serially about the rim for removing the tire from the rim.

Other objects and a more complete understanding of the invention may be had by referring to the following specification and claims taken in conjunction with the accompanying drawings in which:

FIG. 4 is a fragmentary sectional view of another embodiment of the tool of the present invention;

FIG. 5 is a fragmentary sectional view taken along line 5—5 of FIG. 4;

FIG. 6 is a fragmentary sectional view of carrying means which may be utilized in the embodiment of FIGS. 1-5 and illustrating the means in a first position which permits insertion and removal thereof; and FIG. 7 is a view of a portion of the carrying means illustrated in FIG. 6 but showing the means in a second position.

Figure 1:
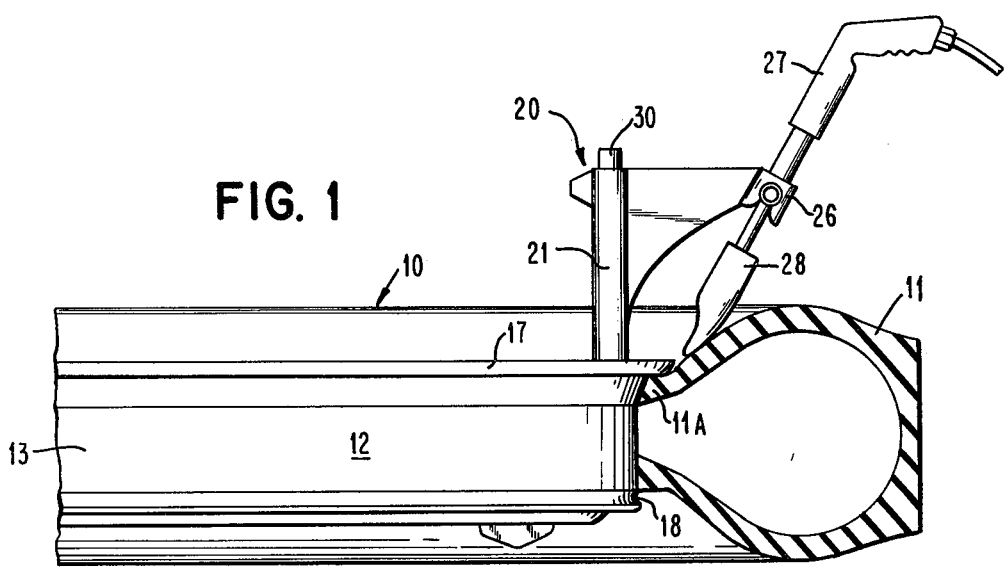
FIG. 1 is a fragmentary side elevational view showing in schematic form a tool constructed in accordance with the present invention and in a position to remove a tire from a rim.
Figure 2:
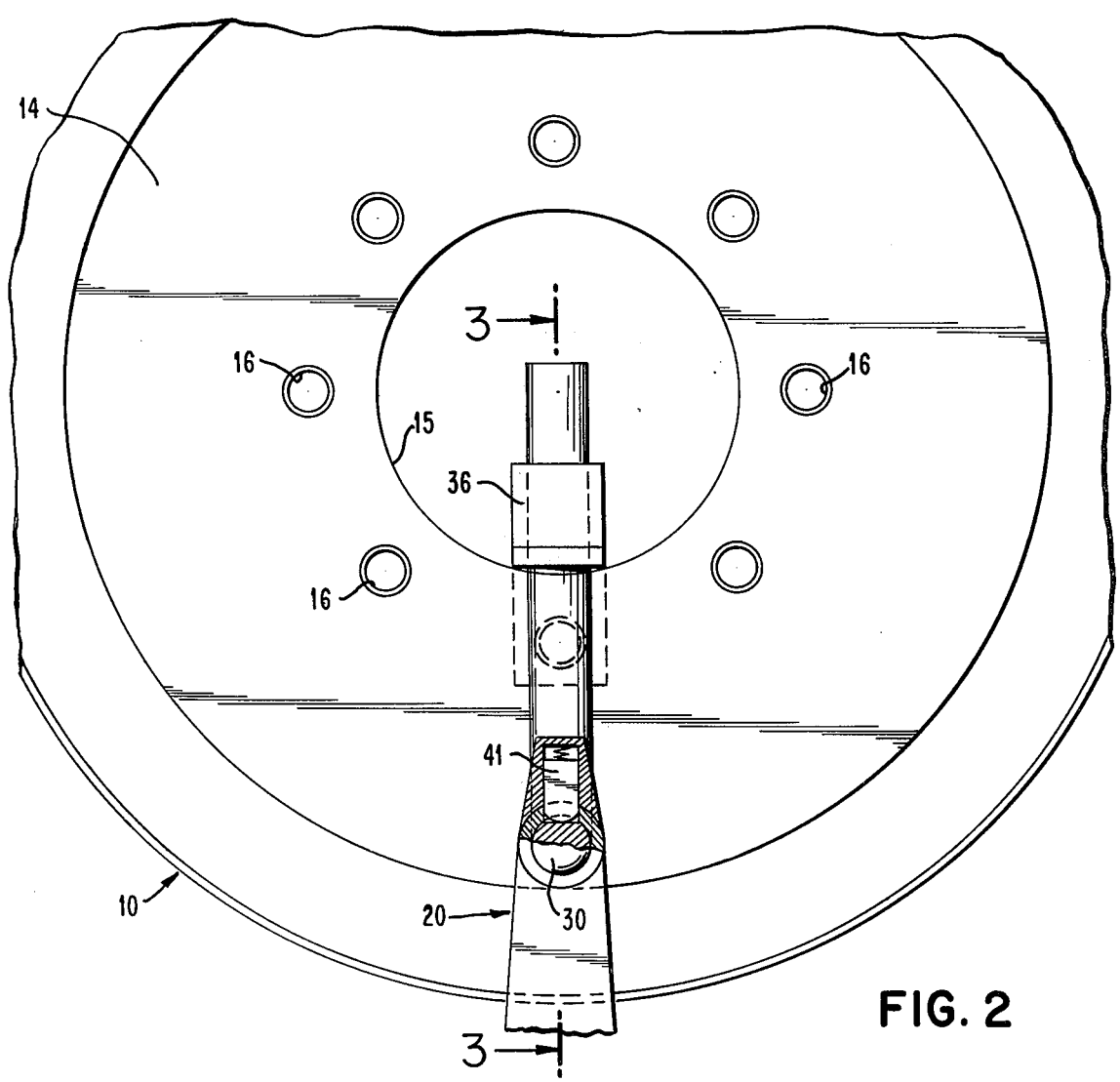
FIG. 2 is an enlarged fragmentary plan view illustrating the apparatus of FIG. 1 in a different position.

Referring now to the drawings, and especially FIG. 1 thereof, a wheel 10 comprising a pneumatic tire 11 and a rim 12 is shown therein. As shown in FIGS. 1 and 2, the rim 12 includes an upstanding, circumferentially extending flange portion 13 and a web 14 which is substantially closed but includes a central aperture 15 and a plurality of lug hole apertures 16 to receive the studs which connect the wheel to the axle. As shown in FIG. 1, the rim includes, at one end of the flange 13, a lip 17 which serves to engage one bead 11A of the pneumatic tire 11, while the opposite extent of the flange 13 includes a groove or the like 18 for receiving a locking ring, in the present instance the locking ring having been removed as by the adapter described and shown in Applicant's co-pending patent application Ser. No. 293,313, now U.S. Pat. No. 3,841,380.

In accordance with the invention, a tool 20 is adpated for clamping to the rim 12 in order to provide a stable platform for a power unit 27 to apply pressure against the wall of the pneumatic tire 11 and to force the tire from the rim 12. To this end, the tool 20 comprises a barrel 21 having a central bore 22 therein and a radially extending bracket 25. A rod 30, having a first portion 31 extending through the barrel, is mounted for adjustment axially of the barrel in the bore 22 thereof. The rod 30 includes a second portion 32 which extends substantially perpendicular to the first portion and is joined thereto by an arcute elbow portion 33. Preferably the second portion 32 of the rod 30 has a length sufficient to overlie the central aperture 15 of the web 14 of the rim 12.

As will be explained in more detail hereinafter, the bracket 25 includes means 26 at one extended end thereof for holding a power unit 27 including a driven wedge 28 for applying pressure against the side wall of the tire 11 and forcing the tire from the rim 12. The power unit may take any of several forms such as discussed in the prior patents of the present Applicant or, for example, may take the form of the fluid pressure amplifier described in Ser. No. 493,702 filed Aug. 1, 1974 by the present Applicant. Regardless of the type of power unit 27, it may be seen from FIG. 1 that applying a downward pressure on the tire 11 will cause the bead to move downwardly and apply an upward force on the tool equal in magnitude and opposite in direction of that of the wedge 28. Thus the barrel 21 of the tool 20 must be coupled to the rod 30, and the rod in turn must be coupled to the rim 12. To this end, and referring to FIG. 3, the rod 30 is connected to the web 14 of the flange 13 as by a disk shoe 35. As illustrated best in FIG. 3, the shoe member 35 comprises a sleeve 36 having a bore 37 adapted to receive the second portion 32 of the rod 30, the shoe including an offset flange portion 38 depending from the sleeve and spaced from the second portion 32 of the rod 30. The flange portion 38 is spaced a distance from the second portion 32 grater than the thickness of the web 14 of the rim.

In order to provide frictional engagement for restrained sliding action of the shoe relative to the second portion 32 of the rod 30, the bore 37 of the sleeve 36 includes means for frictionally engaging the sleeve to the second portion of the rod. To this end, the bore 37 includes a leaf spring or the like 39 which is biased against the rod. In this manner, with the second portion 32 of the rod 30 extending over the aperture 15, the shoe may be slipped onto the end of the rod, frictionally engaged thereon and positioned so that the flange 38 engages the web 14. Thus any upward motion of the rod 30 is restrained by engagement of the flange 38 against the web.

In order to properly couple the bracket 25 to the first portion 31 of the rod 30, locking means are provided for clamping the first portion of the rod in a predetermined axial position in the barrel 21. To this end, the locking means 40 comprises a locking pin 41 mounted in a protrusion or projecton 42 in the side of the barrel 21. The locking pin 41 is biased as by the spring 43 against the first portion 31 of the rod 30. The pin is adapted to engage in one of a plurality of recesses 31A which are serially arranged along the first portion of the rod and dimensioned to receive the pin. The rod, especially the first portion 31, is typically circular in cross section so that the recesses include a camming surface 31B for bearing contact against the pin so that upon relative rotary motion between the barrel 21 and the rod, the pin is cammed against the biasing spring 43 and out of its recess so that the barrel 21 may be adjusted axially of the rod 30. Inasmuch as the shoe 35 clamps the second portion 32 of the rod 30 against the web 14 of the rim 12, in order to disengage the locking pin 41 from the first portion 31 of the rod, the bracket may be turned thus camming the pin out of the recess and permitting such necessary axial adjustment to bring the bracket 25 against the interior or lip 17 of the flange 13 of the rim 12. In actual practice it is not essential that the bracket contact the lip 17 of the flange 13, but such action does serve to wedge the rod 30 in position with the shoe 35 in engagement with the underside of the web 14.

Figure 3:
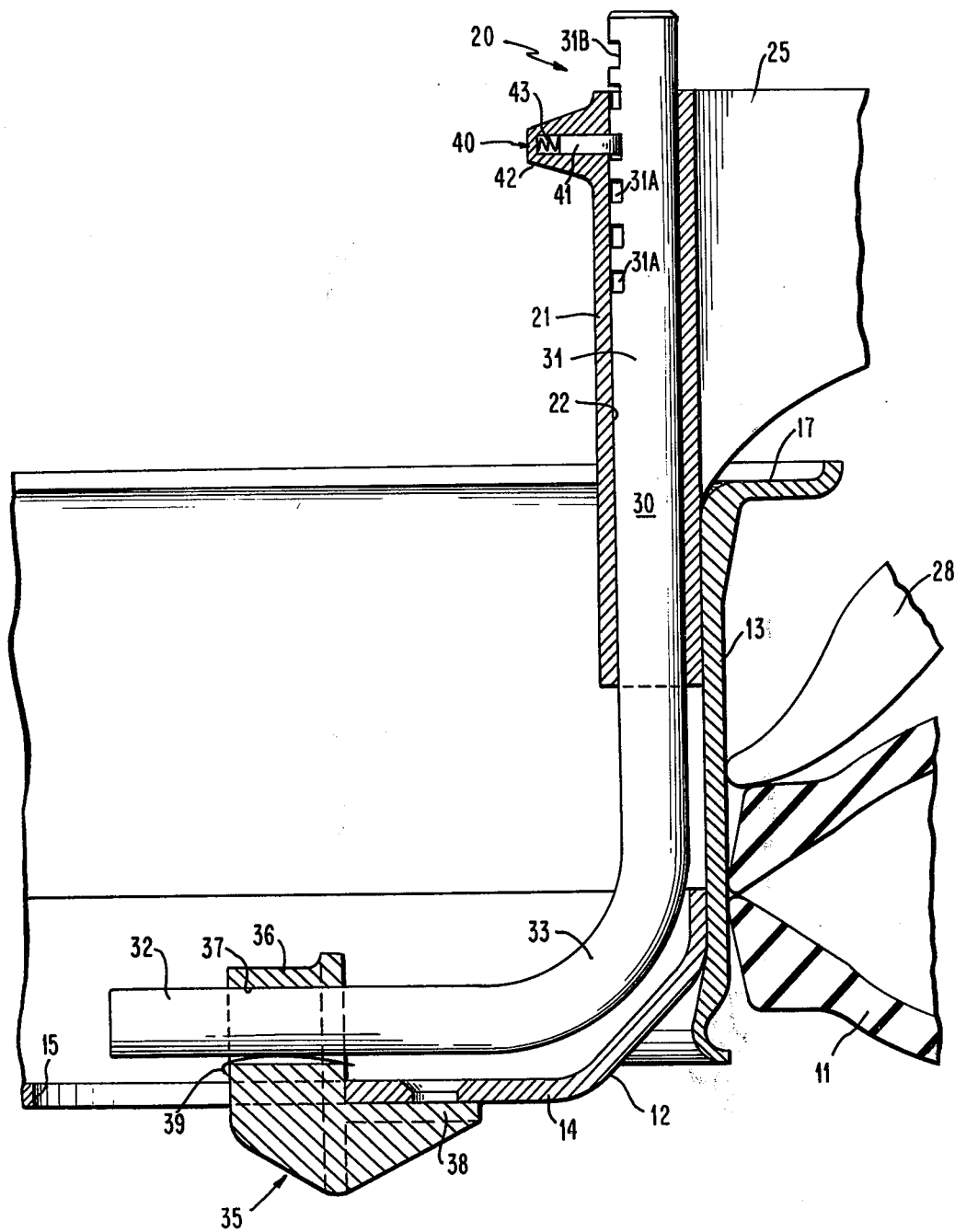
FIG. 3 is an enlarged fragmentary sectional view taken along line 3—3 of FIG. 2.

As may be appreciated the barrel may take a number of forms but must have sufficient strength so that a power unit may be connected at the extended end of the bracket to permit the prying action of the wedge 28 against the tire for removal of the tire from the rim. One other form of barrel and bracket is illustrated in FIG. 4 wherein the bracket is separated from the barrel as opposed to the integral form of barrel and bracket in FIGS. 1–3. To this end, and as best illustrated in FIG. 4, the barrel 21A is in essence a sleeve or tube which fits over the rod 30A, while the bracket 25A includes a lower offset collar clamp 26A which is bolted to the barrel 21A as by screws or lugs 27A, 27B. An upper offset portion or protrusion 28A embraces the rod and includes a spring biased locking pin 29A for receipt and capture of the rod 30A in recesses 31A serially arranged along the rod 30A. The bracket and tube assembly illustrated in FIG. 4 provide a structure which is more easily manufactured and at a lower cost than the structure of FIGS. 1–3. For example, the structure of the tool in FIG. 4 may be cast while that illustrated in FIGS. 1–3 is forged and requires welding of the bracket to the barrel.

In order to couple the power unit 27 to the bracket 25A, or the bracket 25, coupling means are provided at the extended end 45 of the bracket 25 and 25A. To this end, and as best shown in FIG. 5, the extended end 45 of the bracket 25A, for example, includes a pair of yokes 46 and 47 which permit studs 49 which extend outwardly from the power unit 27 to be captured therein. The yokes 46 and 47 have open lower ends such as at 46A, 47A and closed upper ends such as at 46B to receive respectively therein the studs 49 on the power tool. In order to retain the studs on the power unit 27 within the yoke 46 and 47, the yokes are slotted to receive capture pins 50 which pass through each of the yokes beneath the studs 49 thus retaining the studs 49 within the yoke 46 and 47.

The operation of the tool 20 is as follows: after the lock ring is removed from the groove 18 (FIG. 1) and the bead has been broken as by the apparatus illustrated in the co-pending application of the Applicant, now U.S. Pat. No. 3,841,380, the wheel is inverted and the tool 20 is positioned with the second portion 32 of the rod 30 over the central aperture 15 of the rim. The disk shoe 35 is then slipped over the extended end of the second portion 32 and the flange 38 embraces the lower portion of the web 14. The bracket 25 or 25A, in a position to hold the locking pin 41 out of the recesses 31A, is lowered and then rotated for locking pin engagement in a recess. The wedge 28 is then pressed against the side wall of the tire 11. Pressure is applied and the tire is pushed or levered off of the flange 13 of the rim 12. As best illustrated in FIG. 3, as the wedge 28 pushes down on the tire separating it from the flange 13 of the rim 12, an equal but opposite force is applid on the bracket against the rod, the rod tending, as shown with respect to FIG. 3, to move in a counterclockwise direction, the upward thrust being placed on the shoe 35 and its flange 38 impinging against the web 14 of the rim 12. As the wedge moves further downwardly the counterclockwise rotation of the rod tends to increase until the arcuate elbow portion 33 of the rod 30 engages the interior of the rim 12 and thereby is braced permitting removal of the tire from the rim. After the tire is removed from the rim at that one portion thereof, release of pressure by the power tool 27 permits easy rotation of the tool around the tire for a new purchase by the wedge 28 against the side wall of the tire.

It is desirable to provide means to carry the tool and to hold the rod when rotating the bracket for correct positioning thereof, while permitting quick disassembly of the tool. To this end, carrying means 60 are provided removably coupled to, in the present instance, the rod 30. The carrying means 60 comprises a handle 61 having a central passageway 62 therein in which is mounted a reciprocating shaft 63. The shaft 63 extends beyond the terminal end 64 of the handle 61. The shaft 63 includes a reduced diameter section 65 which merges into the larger diameter portion thereof as by a tapered section forming a camming surface 66. As shown, the handle 61 includes a tubular projection 67 having a circumferentially extending flange portion 68, the tubular projection 67 dimensioned for engagement in a bore 69 in the terminal end of the first portion 31 of the rod 30, while the flange 68 acts as a stop for seating on the extended terminal end of the rod 30.

In order to permit quick coupling and uncoupling of the handle 61 to the rod 30, coupling means 70 which includes means to grip the shaft 63, is provided for causing the handle to be connected to the rod 30. To this end, the coupling means 70 comprises a pair of radially extending slots or passageways 71 and 72 extending from the bore 69 which register with apertures 73 and 74 in the side wall of the tubular projection 67 of the handle 61. Snugly captured in the apertures 73 and 74 are a pair of balls 75 and 76 which are captured within the tubular projection as by staking the terminal ends of the apertures 73 and 74. By fabricating the handle as a malleable casting, the upsetting of the terminal ends of the apertures permits the balls to project from the ends of the apertures and effect a locking action in the slots 71 and 72, as hereinafter described. Upon movement of the shaft downwardly from a first postion such as is shown in FIG. 7, to a second position such as is shown in FIG. 6 the camming surface 66 causes the balls 75 and 76 to move radially outward effecting a jamming of the balls in the passageways 71 and 72 and locking the handle 61 into the rod 30. When it is desired to remove the handle 61 from the rod 30, upward movement of the shaft permits the balls 75 and 76 to move inwardly, such as shown in FIG. 7, and permits removal of the handle. The frictional engagement of the handle permits easy carrying of the tool while holding the rod stable. Additionally, this permits grasping the bracket and effecting rotation of the same so that the barrel and bracket may be adjusted axially of the rod 30. Alternately, if it is desired to remove the rod, either for replacement or to utilize the tool for rims having other than a closed web such as is illustrated in FIG. 2, the rod may be replaced, for example, by the rod such as illustrated in U.S. Pat. No. 3,002,548, issued on Oct. 3, 1961 to the present inventor wherein the rod includes a lower hook for grasping the inside lip adjacent the locking ring groove 18. In this manner simple removal of the handle permits easy replacement of the rod or disassembly of the tool for inspection and cleaning.

Accordingly, the tool of the present invention is simple in operation and yet permits tire removal in those situations where the rims of the wheel includes a substantially closed web with a central aperture.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. A tool for removing a tire from an annular rim including an upstanding, circumferentially extending flange and having a substantially closed web with a central aperture therein; said tool comprising: a barrel, a bracket connected to said barrel while extending radially therefrom; a rod having a first portion extending through said barrel and adjustable axially of said barrel; a second portion of said rod extending substantially perpendicular to said first portion; said second portion having a length sufficient to overlie the central aperture of the web of a rim; a shoe member slidably mounted on said second portion of said rod and adapted to embrace the web of said rim on one side thereof with said rod on the opposite side thereof and adjacent the periphery of said aperture; locking means for clamping said first portion of said rod in a predetermined position relative to said barrel and said bracket; and means on said bracket for receiving a power unit.

2. A tool in accordance with claim 1 wherein said locking means comprises a pin; means biasing said pin against the first portion of said rod; a plurality of recesses arranged serially along said first portion of said rod and dimensioned to receive said pin.

3. A tool in accordance with claim 2 wherein said recesses include a camming surface for bearing contact against said pin so that upon relative rotary motion between said barrel and said rod, said pin is cammed out of said recesses permitting axial adjustment of said bracket relative to said rod.

4. A tool in accordance with claim 1 wherein said shoe member comprises a sleeve dimensioned to receive said second portion of said rod; and an offset flange portion depending from said sleeve and spaced from said second portion of said rod.

5. A tool in accordance with claim 4 including means in said sleeve portion of said shoe for frictionally engaging said sleeve to said second portion of said rod.

6. A tool in accordance with claim 1 including carrying means on the terminal end of said first portion of said rod, and coupling means to connect said carrying means to said first portion of said rod.

7. A tool in accordance with claim 6 wherein said carrying means comprises a handle, a bore in said terminal end of said first portion of said rod, a passageway in said handle having a shaft extending through said passageway and projecting therefrom; said coupling means comprising rod gripping means carried by said handle, and means on said shaft for actuating said gripping means to effect coupling of said handle to said rod.

8. A tool in accordance with claim 7 wherein said rod gripping means includes slots in said bore extending radially therefrom; said means on said shaft for actuating said gripping means comprising a camming surface on said shaft; said rod gripping means further including balls captured in said handle and dimensioned for entry into said slots upon camming engagement by said camming surface to thereby lock said handle to said rod.

9. A tool in accordance with claim 1 wherein said means on said bracket for receiving a power unit comprises a yoke adapted to receive a pin on said power unit, and means for retaining said pin on the power unit in said yoke.

10. A tool in accordance with claim 1 wherein said barrel is integrally connected to said bracket.

11. A tool in accordance with claim 1 wherein said barrel comprises a sleeve, means clamping said sleeve to said bracket, and said tool further comprising means on said bracket for embracing said first portion of said rod, and for receiving said locking means.

* * * * *